United States Patent Office 2,721,224
Patented Oct. 18, 1955

2,721,224

TREATMENT OF TETRACHLOROBENZENE

Jacob Rosin, Maplewood, N. J., assignor to Montrose Chemical Company, a corporation of New Jersey No Drawing. Application August 30, 1952,
Serial No. 307,371

4 Claims. (Cl. 260—650)

This invention relates to a process for the isolation of 1,2,4,5-tetrachlorobenzene from chlorination mixtures. When benzene or chlorinated benzene is chlorinated to the point where the mixture contains predominantly tetrachlorobenzene, the mixture also contains a number of other substances, among them the isomers of 1,2,4,5-tetrachlorobenzene, some trichlorobenzenes and some pentachlorobenzene. In the case of the chlorination of trichlorobenzene to tetrachlorobenzene, wherein the reaction is carried on to an extent such that the yield is from 85%–100% of the theoretical yield, I have found that only 1,2,4,5-tetrachlorobenzene will crystallize out of the reaction mixture if the crystallization is carried out at a temperature of about 25° C. or above.

The crystallized material may be filtered from the mother liquor, but the 1,2,4,5-tetrachlorobenzene is not sufficiently pure because of adhering motor liquor which must be eliminated. No solvents are known which can be used to effect a quantitative separation between the precipitated 1,2,4,5-tetrachlorobenzene crystals and the adhering mother liquor. If one washes the crystals with a solvent in which 1,2,4,5-tetrachlorobenzene has a very low solubility, such as methanol, the solvent is apt to precipitate out other isomers of tetrachlorobenzene, as well as pentachlorobenzene, and thus defeat the purpose of the treatment. If one uses a good solvent for the mother liquor such as benzol, toluene, xylene or the like, the purpose is likewise defeated because much of the 1,2,4,5-tetrachlorobenzene is dissolved if the temperature is elevated, and undesirable isomers will crystallize out if the temperature is low. Moreover, the high solvent losses may make the process impractical in the production of a relatively cheap chemical such as 1,2,4,5-tetrachlorobenzene.

I have found that 1,2,4,5-tetrachlorobenzene can be separated from adhering mother liquor by slurrying the 1,2,4,5-tetrachlorobenzene crystals in water containing an emulsifying agent and at a temperature not lower than approximately 25° C. After washing with the water and emulsifier, the cake is refiltered, whereupon it is again washed with plain water to completely eliminate the mother liquor without the precipitation of any undesirable impurities and without the loss of any substantial quantity of 1,2,4,5-tetrachlorobenzene.

Any of the well-known emulsifying agents, including ordinary soap, may be used in the present process, but I prefer to use those which do not form a precipitate in hard waters such as petroleum sulfonates, including aryl alkyl sulfonates, sulfated alcohols, esters of polyethylene glycol with fatty acids, and the like. A list of suitable surface acting agents is found in Chemical Industries, volume 61, pages 811–824 (November 1947). One particularly suitable form of emulsifying agent is that sold on the market as Drew's Base M–401, which contains about 90% polyglycol esters of fatty acids, and 10% of petroleum sulfonates.

The following example illustrates a preferred method of practicing the present invention.

Trichlorobenzene was introduced into a chlorinator and heated to 100° C. Chlorine was then bubbled into the chlorinator until a quantity was added which was 90% of theory, based on the conversion of trichlorobenzene to tetrachlorobenzene. The chlorination mixture was then cooled to 25° C. and filtered. The wet filter cake was then slurried in two parts by weight of an aqueous solution containing 5% of Drew's Base M–401 emulsifier, described above. After slurrying, the filter cake was filtered and then washed until the filtrate ran clear. The filter cake was then analyzed and found to be substantially pure 1,2,4,5-tetrachlorobenzene. The filtrates from the emulsifier wash and the washing with plain water were saved and the rest of the water was discarded. The filtrates were heated to about 90° C. and salt added to make a 5% NaCl solution. Immediate precipitation of an oil layer took place. The oil layer was separated from the aqueous layer and subjected to vacuum distillation at a pressure of 20 mm. until the still temperature reached 220° C. All of the chlorinated benzenes of the aqueous mother liquor were recovered as distillate, the residue in the still contained the emulsifying agent which would be reused in the process.

I claim:

1. A process for the isolation of 1,2,4,5-tetrachlorobenzene from a reaction mixture containing tetrachlorobenzenes, trichlorobenzenes and pentachlorobenzene comprising chilling the reaction mixture to about 25° C. to precipitate 1,2,4,5-tetrachlorobenzene therefrom, filtering said reaction mixture to obtain a filter cake containing 1,2,4,5-tetrachlorobenzene in crystalline form wet with mother liquor, slurrying said filter cake with an aqueous solution containing a wetting agent, filtering said slurry, and washing the filter cake with water.

2. The process of claim 1 wherein about twice the weight of the aqueous solution is used per unit of weight of the filter cake.

3. The process of claim 1 wherein the emulsifying agent is a mixture of polyglycol esters of fatty acids and petroleum sulfonate.

4. A process for the isolation of 1,2,4,5-tetrachlorobenzene from a reaction mixture containing tetrachlorobenzenes, trichlorobenzenes and pentachlorobenzene comprising chilling the reaction mixture to about 25° C. to precipitate 1,2,4,5-tetrachlorobenzene therefrom, filtering said reaction mixture to obtain a filter cake containing 1,2,4,5-tetrachlorobenzene in crystalline form wet with mother liquor, slurrying said filter cake with an aqueous solution containing a wetting agent, filtering said slurry to produce a filtrate and a filter cake, washing the filter cake with water to produce additional filtrate, combining the filtrates, heating the filtrates to about 90° C. and adding sodium chloride thereto to produce a 5% sodium chloride solution and to precipitate an oil layer, separating the oil layer and distilling said oil layer to recover the chlorinated benzenes of the mother liquor.

References Cited in the file of this patent

UNITED STATES PATENTS

| | | |
|---|---|---|
| 1,934,675 | Mills | Nov. 7, 1933 |
| 2,514,191 | Rowland et al. | July 4, 1950 |